United States Patent
Wang et al.

(10) Patent No.: US 8,062,782 B2
(45) Date of Patent: Nov. 22, 2011

(54) BATTERY LATCHING DEVICE FOR PORTABLE ELECTRONIC DEVICE

(75) Inventors: Xiao-Zhou Wang, Shenzhen (CN); Lei Wang, Shenzhen (CN); Zhen-Gang Ding, Shenzhen (CN); Bin Zhao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 327 days.

(21) Appl. No.: 12/475,667

(22) Filed: Jun. 1, 2009

(65) Prior Publication Data

US 2010/0119924 A1 May 13, 2010

(30) Foreign Application Priority Data

Nov. 12, 2008 (CN) .......................... 2008 1 0305493

(51) Int. Cl.
*H01M 2/10* (2006.01)
(52) U.S. Cl. ............. 429/97; 429/98; 429/100; 361/747
(58) Field of Classification Search .................... 429/96, 429/97, 98, 100; 361/747, 801, 802, 803, 361/679.01, 679.02, 679.58, 600; 292/345, 292/292; 439/136, 152, 153, 157, 159, 160
See application file for complete search history.

(56) References Cited

U.S. PATENT DOCUMENTS

| | | | | |
|---|---|---|---|---|
| 5,125,505 A * | 6/1992 | Kurosaki | ...................... | 206/39.4 |
| 6,129,572 A * | 10/2000 | Feldman et al. | .............. | 439/328 |
| 7,623,180 B2 * | 11/2009 | Ariga | ............................ | 348/373 |
| 7,824,791 B2 * | 11/2010 | Nakashima et al. | ............ | 429/96 |
| 2005/0077873 A1* | 4/2005 | Watson et al. | ................. | 320/114 |
| 2007/0165365 A1* | 7/2007 | Kamiya | ........................ | 361/679 |

* cited by examiner

*Primary Examiner* — Jerry Lorengo
*Assistant Examiner* — Carlos Barcena
(74) *Attorney, Agent, or Firm* — Altis Law Group, Inc.

(57) ABSTRACT

A battery latching device is using for accommodating a battery and includes a housing, two opposite latching portions, a resisting portion, and a stopping member. The housing has a bottom wall and configured for accommodating the battery therein. The latching portions are formed on the bottom wall of the housing, and are configured for limiting the two opposite sides of the battery. The resisting portion are formed on the bottom wall of the housing and aligned with one end of the latching portions. The stopping member is retained to the bottom wall of the housing and aligned with another end of the latching portions. The two opposite ends of the battery are hold between the resisting portion and the stopping portion. When detaching the battery from the housing, the stopping member is capable of being pressed toward the bottom wall to release the battery.

20 Claims, 6 Drawing Sheets

BATTERY LATCHING DEVICE FOR PORTABLE ELECTRONIC DEVICE

BACKGROUND

1. Technical Field

The present invention generally relates to battery latching devices, and particularly to battery latching devices used in portable electronic devices.

2. Description of Related Art

Batteries are widely used in portable electronic devices, such as personal digital assistants (PDAs), cellular phones, etc. A latch structure is typically used with a battery cover to secure the battery to the electronic device. However, the battery cover can be damaged during disassembly.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary battery latching device and portable electronic device using battery latching device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
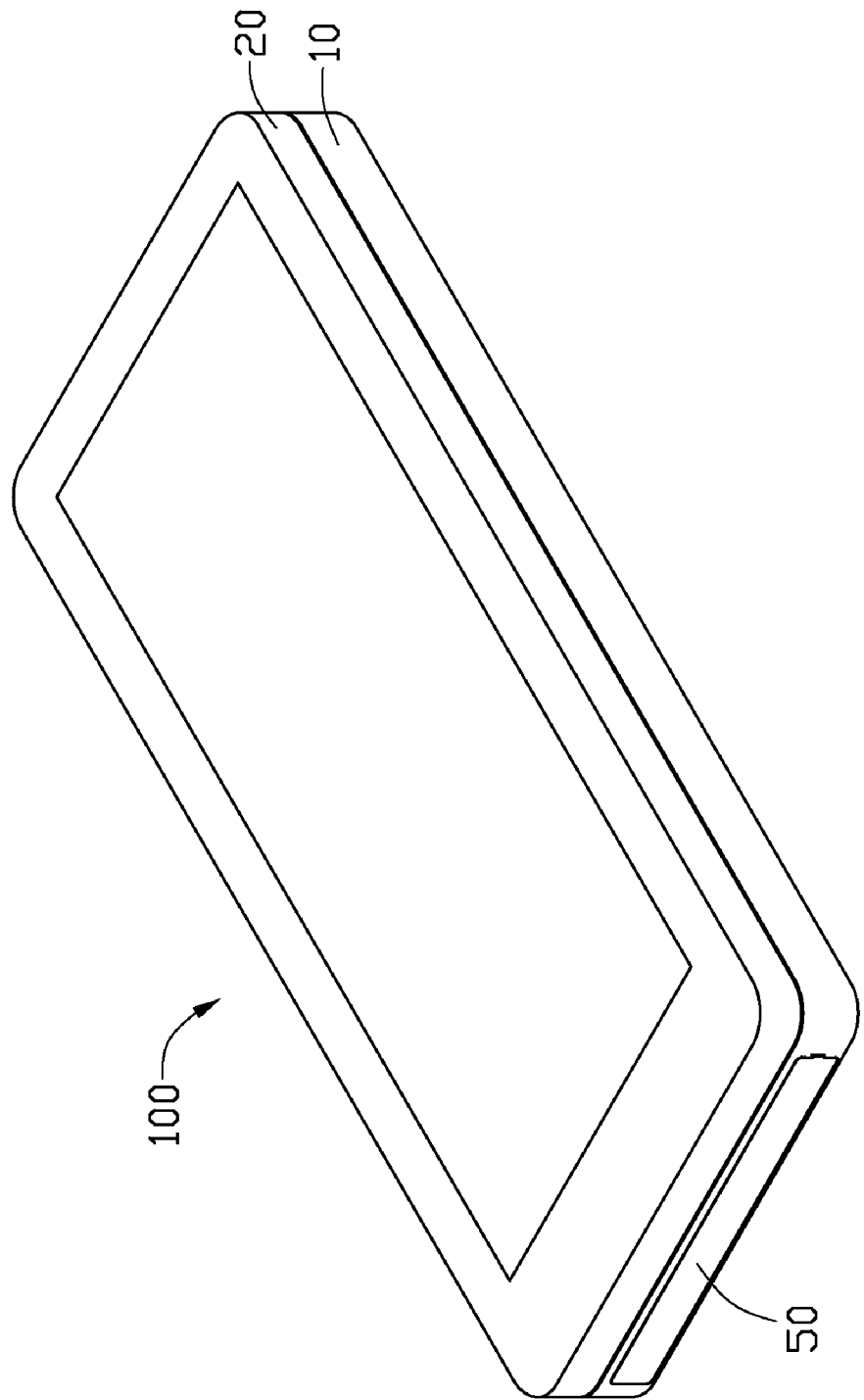
FIG. 1 is an assembled, isometric view of one embodiment of a battery latching devices used in a portable electronic device, the portable electronic device including a first housing, a second housing and a sealing member.
Figure 2:
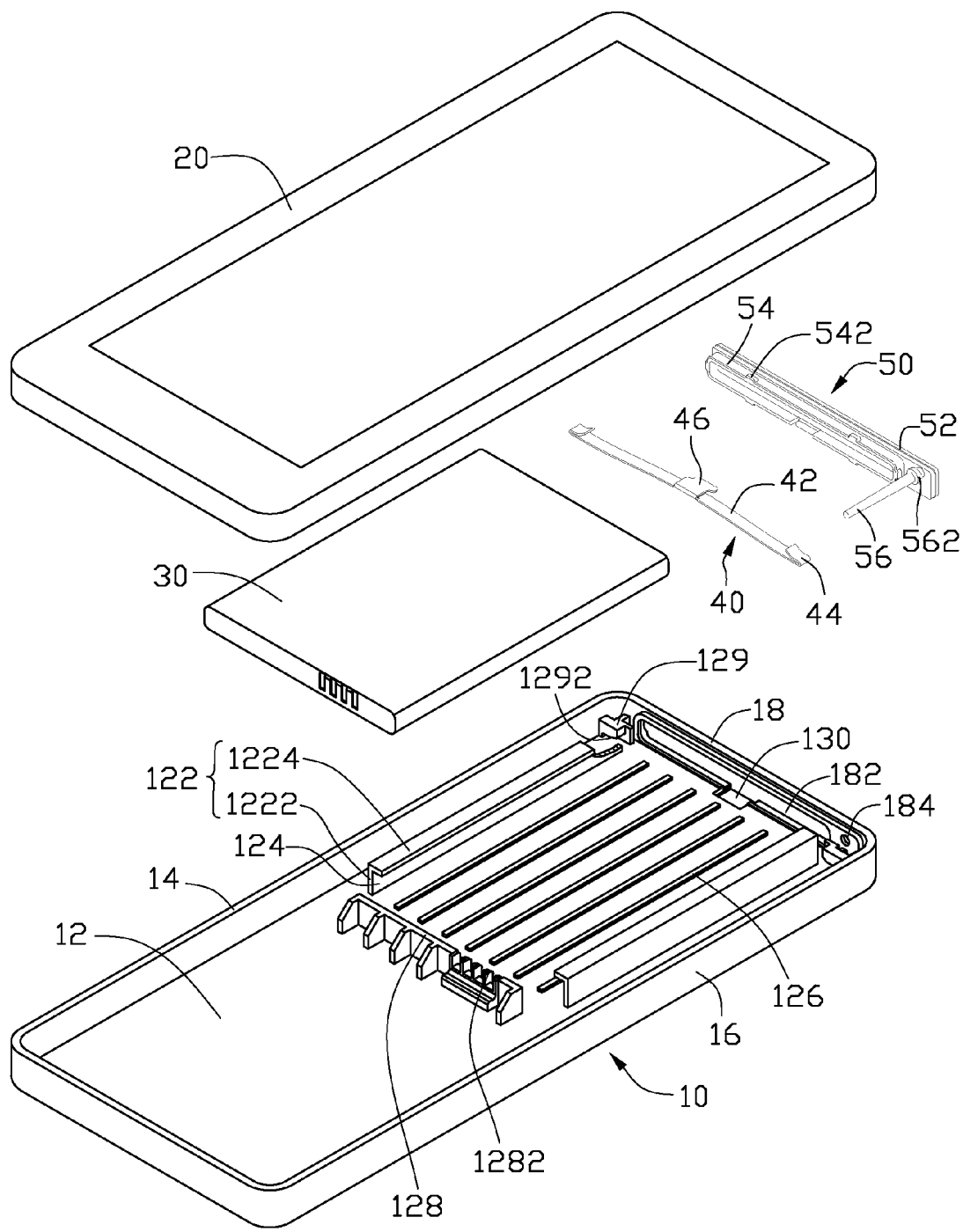
FIG. 2 is an exploded, isometric view of the portable electronic device shown in FIG. 1.
Figure 3:
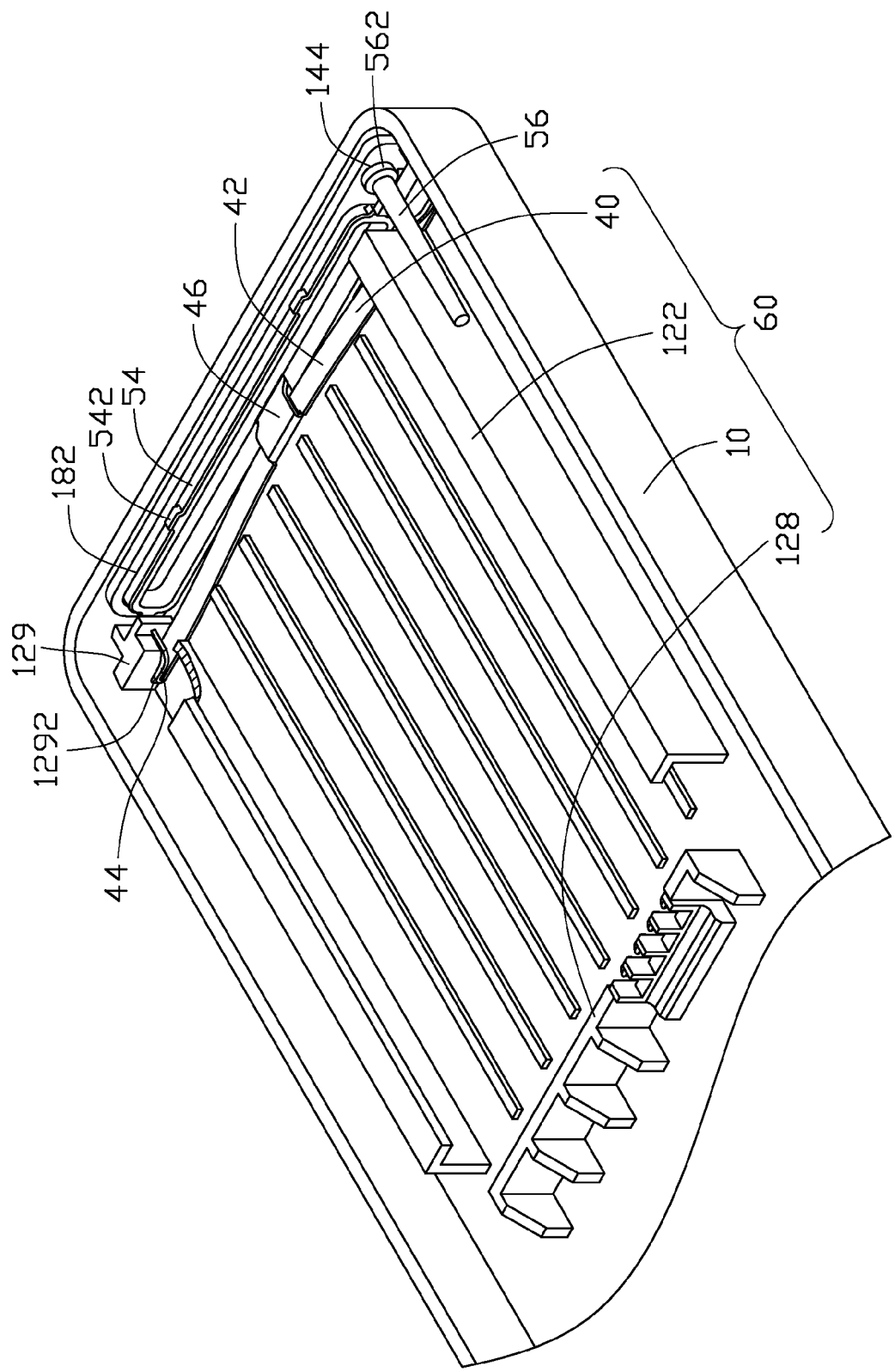
FIG. 3 is a partially assembled view of which a stopping member, the sealing member and the first housing are assembled together.

Referring to FIGS. 1 to 3, one embodiment of a battery latching device 60 (FIG. 3) used in a portable electronic device 100 such as a mobile phone, includes a first housing 10, a second housing 20 mounted to the first housing 10, a battery 30 receivable in the first housing 10, a stopping member 40 secured to the first housing 10, and a sealing member 50 rotationally latched to the first housing 10.

The stopping member 40 is substantially a sheet member, and includes a body section 42, two hook-shaped retaining sections 44 extending from opposite ends of the body section 42, and a guiding section 46 perpendicularly extending from the middle of the body section 42. The body section 42 is elastic and substantially arched. The retaining sections 44 are elastic and located on one side of the body section 42. The guiding section 46 is substantially arched and bent toward the body section 42.

The sealing member 50 includes a rectangular base 52, a mating portion 54 extending from one side of the base 52, a pivot portion 56 located at the side of the base 52 with the mating portion 54. The mating portion 54 is a hollow frame and has a plurality of resisting members 542 protruding from an outer side. The resisting members 542 are located away from the base 52 and configured for latching the sealing member 50 to the first housing 10. The pivot portion 56 is a column protruding from the base 52 and adjacent to the mating portion 54. The pivot portion 56 has a circular flange 562 around a peripheral wall thereof. The circular flange 562 is located apart from the base 52 and used for latching the pivot portion 56 to the first housing 10.

The first housing 10 includes a bottom wall 12 and sidewalls connecting with the bottom wall 12. The sidewalls include a first sidewall 14, a second sidewall 16 located opposite to the first sidewall 14, and a third sidewall 18 perpendicularly connects the first sidewall 14 with the second sidewall 16.

The bottom wall 12 has two latching portions 122 protruding outwards and parallel to the first sidewall 14. One of the latching portions 122 is adjacent to the first sidewall 14, and another latching portion 122 is adjacent to the second sidewall 16. Each latching portion 122 is L-shaped and includes a rectangular first sheet 1222 and a rectangular second sheet 1224. The first sheet 1222 extends perpendicularly from the bottom wall 12. The second sheet 1224 extends perpendicularly from a distal end of the first sheet 1222 towards the center of the first housing 10, thus, a receiving space 124 is enclosed by the first sheet 1222, the second sheet 1224, and the bottom wall 12 of the housing 10. The receiving space 124 is configured for receiving the battery 30. The bottom wall 12 has a plurality of projection sliders 126 formed between the latching portions 122. The projection sliders 126 are parallel with the latching portions 122. The function of the projection sliders 126 is as follows: when the battery 30 is received in the receiving space 124, the bottom wall of the battery 30 can contact with the projection sliders 126 to prevent bottom wall of the battery 30 from directly contacting the bottom wall 12 of the first housing 10, so as to decrease frictional area of the battery 30 thus, decreasing friction force acted on the battery 30, and further facilitate detaching the battery 30 from the receiving space 124.

The bottom wall 12 has a resisting portion 128 protruding parallel to the third sidewall 18. The resisting portion 128 is opposite to the third sidewall 18, i.e., the third sidewall 18 is located adjacent to one end of latching portion 122, and the resisting portion 128 is positioned adjacent to another end of the latching portion 122. The resisting portion 128 has an electric connector 1282 mounted for electrically connecting to the battery 30 when the battery 30 is resisting the resisting portion 128.

The bottom wall 12 has two brackets 129 protruding therefrom and positioned between the third sidewall 18 and the latching portions 122. Each block 129 has a retaining groove 1292 defined in one side of the block facing another block 129. The retaining sections 44 of the stopping member 40 are fixed in the retaining grooves 1292 to assemble the stopping member 40 to the first housing 10. The bottom wall 12 defines a slot 130 between the two brackets 129. The slot 130 corresponds to and configured for receiving the guiding section 46.

The third sidewall 18 defines an opening 182 and a hole 184, and the opening 182 is adjacent to the hole 184. The opening 182 corresponds to the mating portion 54 of the sealing member 50, and has the same size and shape as the mating portion 54. The opening 182 is configured for accommodating the mating portion 54. The hole 184 corresponds to the pivot portion 56 of the sealing member 50, and has the same size and shape as the pivot portion 56.

Referring to FIGS. 1 to 3, to assemble the portable electronic device 100, firstly, the stopping member 40 is bent to shortened its length, and thereby, accumulating an elastic force. Then, the stopping member 40 is inserted between the two brackets 129 of the first housing 10, and the retaining sections 44 of the stopping member 40 are aligned with the retaining grooves 1292 of the brackets 129. After that, the bending of the stopping member 40 is released/stopped such that the stopping member 40 stretches outwardly under the accumulated elastic force until the retaining sections 44 are fully accommodated into the retaining grooves 1292 correspondingly. At this time, the guiding section 46 is located over and bent toward the slot 130 of the first housing 10, the retaining sections 44 are compressed in the retaining grooves 1292, i.e., the retaining sections 44 tend to straighten and tightly secure the stopping member 40 to the first housing 10.

Then, the mating portion 54 of the sealing member 50 is aligned with the opening 182 of the first housing 10 with the pivot portion 56 of the sealing member 50 is aligned with the hole 184 of the first housing 10. The sealing member 50 is pressed into the first housing 10 to snap the mating portion 54 in the opening 182 and latch the pivot portion 56 in the hole 184. At this stage, as the mating portion 54 gradually enter into the opening 182, the side wall of the opening 182 pushes the resisting members 542 so that the mating portion 54 is bent toward the center until the resisting members 542 pass through the opening 182.

Once the resisting members 542 passes through the opening 182, the mating portion 54 restores to a normal state, as a result, the securing portion 542 restricts against the inner wall of the third sidewall 18 to prevent the mating portion 54 from disengaging from the first housing 10. Because the pivot portion 56 has the same size and shape as the hole 184, and the pivot portion 56 has the circular flange 562 surrounding the peripheral wall thereof, the circular flange 562 has the same shape as the hole 184 with a larger size than the hole 184. Thus, the sealing member 50 becomes slidably restricted between the circular flange 562 and the base 52 of the sealing member 50 once the circular flange 562 is squeezed through the hole 184, as a result that the pivot portion 56 is stably latched in the hole 184. Then, the second housing 20 is mounted on the first housing 10 to form the portable electronic device 100.

Figure 4:
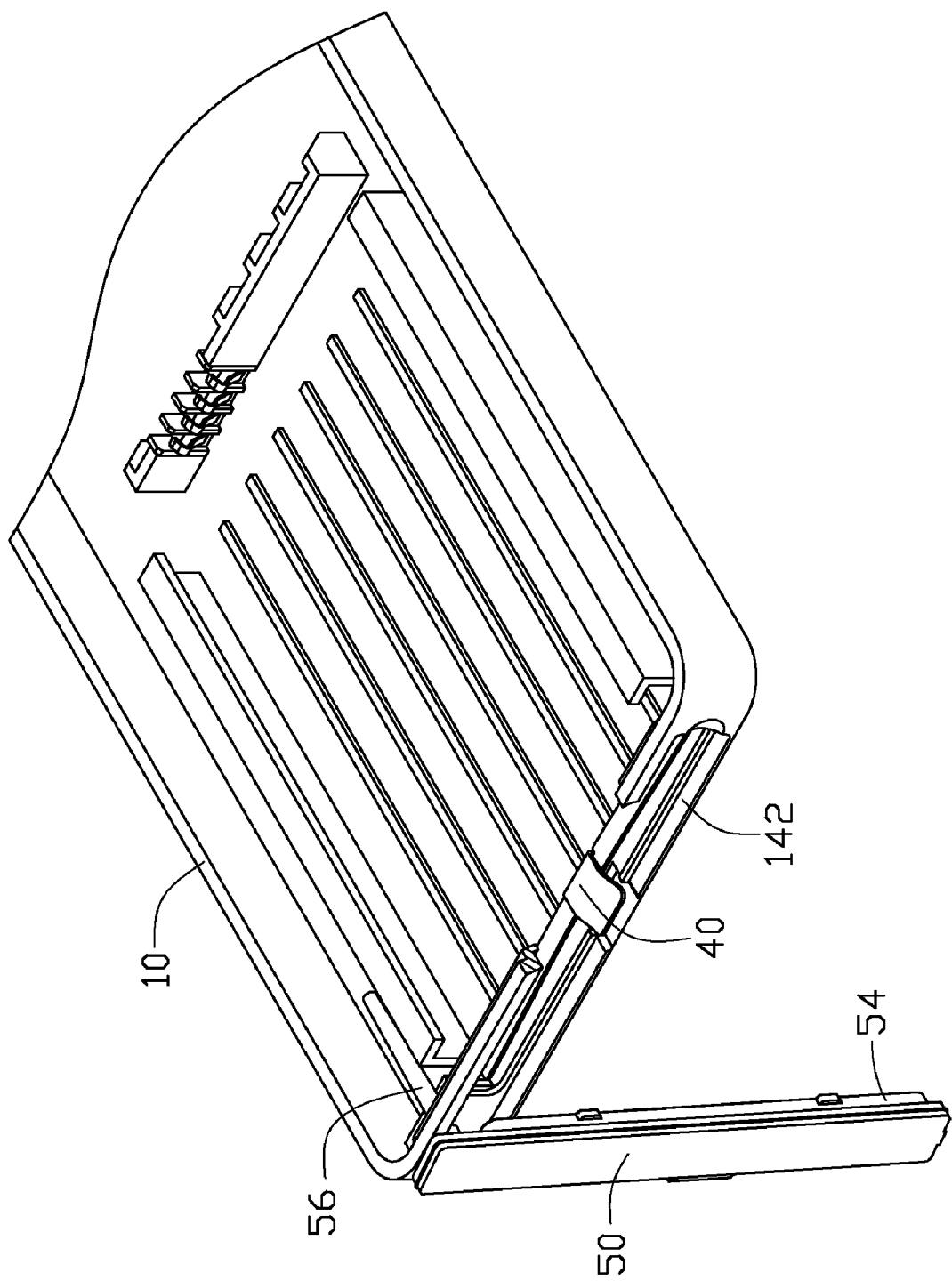
FIG. 4 is similar to FIG. 3, but showing the sealing member in an opened position.
Figure 5:
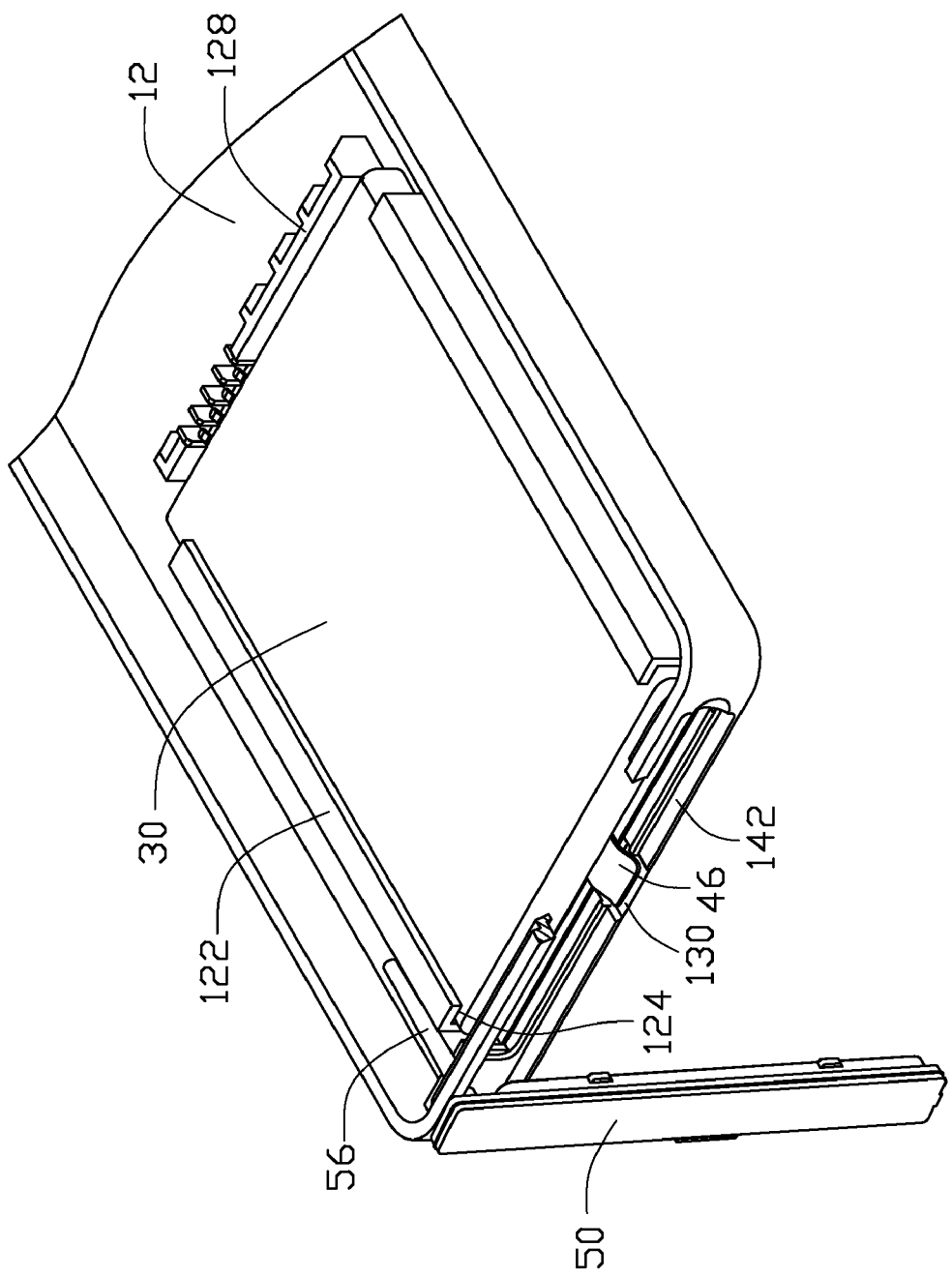
FIG. 5 is a schematic view of a battery partially accommodated in the first housing shown in FIG. 4.
Figure 6:
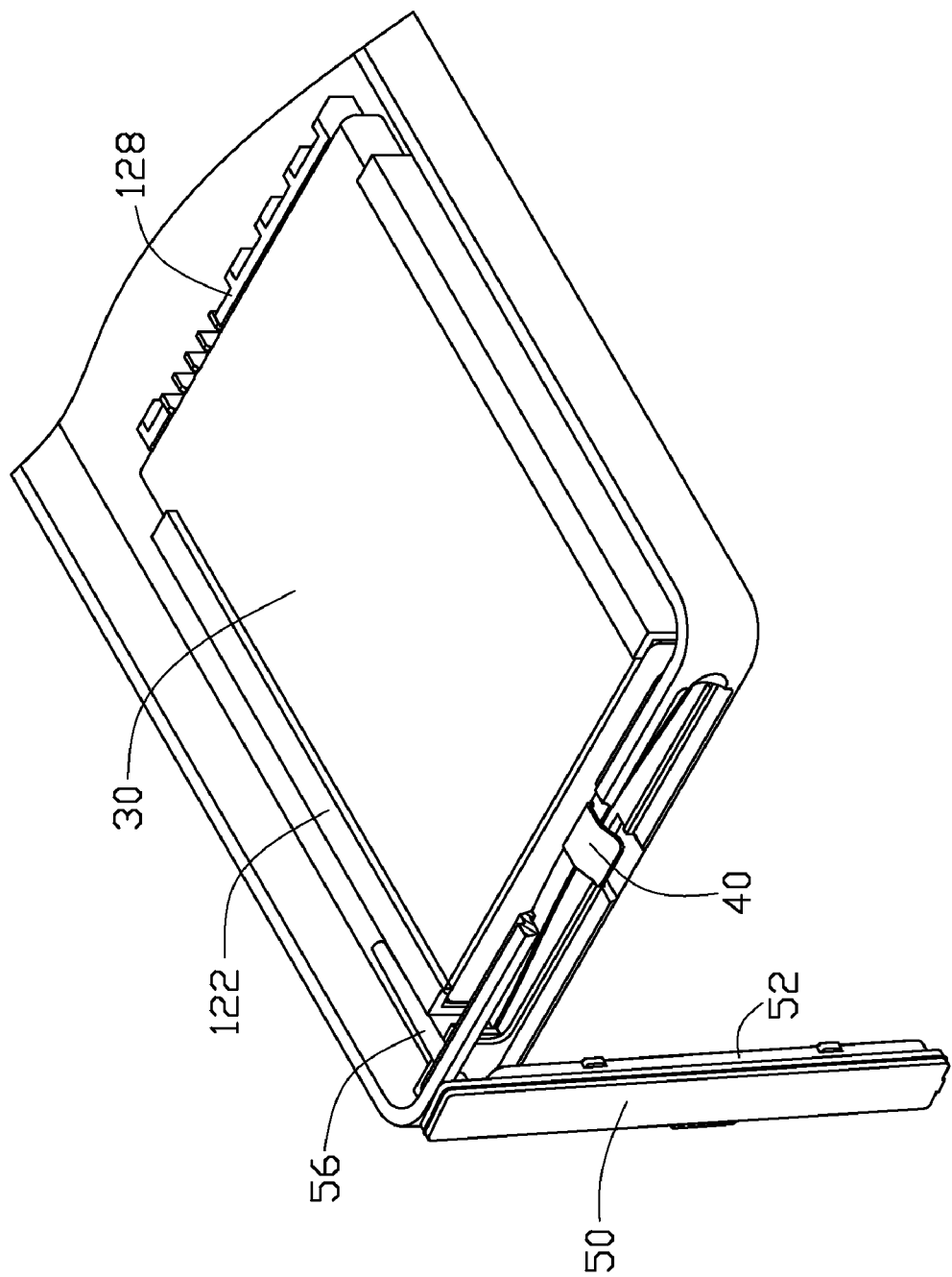
FIG. 6 is similar to FIG. 5, but the battery is totally accommodated in the first housing shown in FIG. 5.

Referring to FIGS. 4 and 6, to insert the battery 30 into the first housing 10, firstly, the mating portion 54 is pulled away from the opening 182 until the securing portion 542 is freed from the first housing 10. Then, the sealing member 50 is rotated about the pivot portion 56 until the opening 182 is fully exposed. After that, the battery 30 is aligned with the opening 182.

Then, the battery 30 is pushed into the opening 182. At this time, the battery 30 moves along the guiding section 46 and pushes the guiding section 46 into the slot 130, as a result, the body section 42 of the stopping member 40 is bent towards the bottom wall 12 of the first housing 10, and the battery 30 can slide through the opening 182 into the receiving space 124 of the latching portion 122.

Once the battery 30 is slid pass the stopping member 40, the stopping member 40 restores to an original state, and the battery 30 is fully received in the receiving space 124. At this time, the opposite ends of the battery 30 is limited between the resisting portion 128 and the stopping member 40, and the opposite sides of the battery 30 is limited between the latching portions 122. Thus the battery 30 is stably secured in the first housing 10 by the battery latching device 60 composed of the first housing 10, the resisting portion 128, the stopping member 40 and the latching portions 122.

Finally, the sealing member 50 is reversely rotated about the pivot portion 56 until the mating portion 54 is aligned with the opening 182 again, then push the sealing member 50 to make the mating portion 54 accommodated in the opening 182, at this time, the resisting members 542 resist against the first housing 10 again.

When detaching the battery 30 from the first housing 10, firstly, the mating portion 54 is pulled away from the opening 182 until the resisting engagement between the securing portion 542 and the first housing 10 is released. Then, the sealing member 50 is rotated about the pivot portion 56 until the opening 182 is exposed. The stopping member 40 is pressed toward the bottom wall 12 of the first housing 10, e.g., the stopping member 40 is leveled with the projection sliders 126. At this time, the battery 30 is freed to slide out of the opening 182.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery latching device comprising:
a housing having a bottom wall and configured for accommodating the battery therein;
two opposite latching portions formed on the bottom wall of the housing, the latching portions being configured for limiting opposite sides of the battery;
a resisting portion formed on the bottom wall of the housing and being aligned with one end of the latching portions; and
a stopping member being bendable and non-rotatably retained to the bottom wall of the housing and being aligned with another end of the latching portions, the stopping member and the resisting portion being configured for holding the battery therebetween;
wherein when detaching the battery from the housing, the stopping member is capable of being pressed toward the bottom wall to release the battery.

2. The battery latching device of claim 1, wherein each latching portion is L-shaped such that a receiving space is formed between the bottom wall of the housing and the latching portion, the receiving space is configured for receiving the battery.

3. The battery latching device of claim 2, wherein each latching portion includes a first sheet and a second sheet, the first sheet extends from the bottom wall of the housing, the second sheet extends from a distal end of the first sheet and toward the center of the first housing, the receiving space is enclosed by the first sheet, the second sheet and the bottom wall of the housing.

4. The battery latching device of claim 1, wherein the stopping member includes an arched body section and a guiding section extending in the middle of the body section and toward the bottom wall of the housing.

5. The battery latching device of claim 4, wherein the stopping member further includes two hook-shaped retaining sections respectively extending from two opposite ends of the body section, the housing has two retaining grooves defined in the bottom wall thereof and corresponding to the retaining sections, the retaining sections are accommodated in the retaining grooves to retain the stopping member to the housing.

6. The battery latching device of claim 1, wherein the housing has an opening defined therein and corresponding to the stopping member, the opening is configured for facilitating the battery entering into the housing.

7. The battery latching device of claim 6, wherein the battery latching device further includes a sealing member for sealing the opening.

8. The battery latching device of claim 7, wherein the sealing member includes a base, a mating portion extending from one side of the base, a pivot portion located at one side of the base same as the mating portion, the mating portion is releasably accommodated in the opening, the pivot portion is rotationally latched to the housing.

9. The battery latching device of claim 6, wherein the housing further includes a sidewall mounted to the bottom wall, the opening is defined in the third sidewall.

10. The battery latching device of claim 9, wherein the mating portion is a hollow frame having a plurality of resisting members protruding from an outer side thereof, the resisting members are located apart from the base, the resisting members are configured for resisting against the sidewall to prevent the sealing member from departing away the first housing.

11. The battery latching device of claim 9, wherein the pivot portion is a column protruding from the base and adjacent to the mating portion, the pivot portion has an circular flange surrounding the peripheral wall thereof, the circular flange is apart from the base and resisting against the inner wall of the sidewall of the housing.

12. A portable electronic device, comprising:
a battery including two opposite ends and two opposite sides;
a housing having a bottom wall and configured for accommodating the battery therein, the bottom wall facing the battery when the battery being accommodated in the housing;
two opposite latching portions formed on the bottom wall of the housing, the latching portions being configured for limiting the two opposite sides of the battery;
a resisting portion formed on the bottom wall of the housing and being aligned with one end of the latching portions; and
a stopping member being bendable and non-rotatably retained to the bottom wall of the housing and being aligned with another end of the latching portions, the stopping member and the resisting portion being configured for holding the battery;
wherein when detaching the battery from the housing, the stopping member is capable of being pressed toward the bottom wall to release the battery.

13. The portable electronic device of claim 12, wherein each latching portion is L-shaped such that a receiving space is formed between the bottom wall of the housing and the latching portion, the receiving space is configured for receiving the battery.

14. The portable electronic device of claim 13, wherein each latching portion includes a first sheet and a second sheet, the first sheet extends from the bottom wall of the housing, the second sheet extends from a distal end of the first sheet and toward the center of the first housing, the receiving space is enclosed by the first sheet, the second sheet and the bottom wall of the housing.

15. The portable electronic device of claim 12, wherein the stopping member includes an arched body section and a guiding section extending in the middle of the body section and toward the bottom wall of the housing.

16. The portable electronic device of claim 15, wherein the stopping member further includes two hook-shaped retaining sections respectively extending from two opposite ends of the body section, the housing has two retaining grooves defined in the bottom wall thereof and corresponding to the retaining sections, the retaining sections are accommodated in the retaining grooves to retain the stopping member to the housing.

17. The portable electronic device of claim 12, wherein the housing has an opening defined therein and corresponding to the stopping member, the opening is configured for facilitating the battery enters into the housing.

18. The portable electronic device of claim 17, wherein the battery latching device further includes a sealing member for sealing the opening.

19. The portable electronic device of claim 18, wherein the sealing member includes a base, a mating portion extending from one side of the base, a pivot portion located at one side of the base same as the mating portion, the mating portion is releasably accommodated in the opening, the pivot portion is rotationally latched to the housing.

20. The portable electronic device of claim 17, wherein the housing further includes a sidewall mounted to the bottom wall, the opening is defined in the third sidewall.

* * * * *